US010877711B2

(12) United States Patent
Miyadome (10) Patent No.: US 10,877,711 B2
(45) Date of Patent: Dec. 29, 2020

(54) DISPLAYING PROGRESS STATUS OF PRINTING

(71) Applicant: SEIKO EPSON CORPORATION, Tokyo (JP)

(72) Inventor: Yasuaki Miyadome, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/575,868

(22) Filed: Sep. 19, 2019

(65) Prior Publication Data

US 2020/0097236 A1 Mar. 26, 2020

(30) Foreign Application Priority Data

Sep. 21, 2018 (JP) .................................. 2018-177079

(51) Int. Cl.
*G06F 3/12* (2006.01)
(52) U.S. Cl.
CPC .......... *G06F 3/1259* (2013.01); *G06F 3/1207* (2013.01); *G06F 3/1294* (2013.01)
(58) Field of Classification Search
None
See application file for complete search history.

(56) References Cited

U.S. PATENT DOCUMENTS

2019/0018625 A1\* 1/2019 Noguchi ............... G06F 3/1288
2020/0125304 A1\* 4/2020 Van Vliembergen ........................ G06F 3/1282

FOREIGN PATENT DOCUMENTS

JP 2008-129642 A 6/2008

\* cited by examiner

*Primary Examiner* — Lennin R Rodriguezgonzalez
(74) *Attorney, Agent, or Firm* — Workman Nydegger (57) ABSTRACT

A printer includes a printing mechanism configured to print images on a print medium, a print controller configured to make the printing mechanism perform a print job for printing the plurality of images with printing lengths designated, a display device, and a display controller configured to make the display device display a progress image representing an execution state of the print job, wherein the display controller makes the display device display the symbol images corresponding to the respective images with sizes corresponding to the printing lengths of the respective images as the progress image, and the display controller makes the display device display an executed portion indication image representing a length of a portion already printed by the printing mechanism so as to be arranged at a position corresponding to the symbol image.

8 Claims, 8 Drawing Sheets

DISPLAYING PROGRESS STATUS OF PRINTING

The present application is based on, and claims priority from JP Application Serial Number 2018-177079, filed Sep. 21, 2018, the disclosure of which is hereby incorporated by reference herein in its entirety.

BACKGROUND

1. Technical Field

The present disclosure relates to a printing apparatus, a print control device, and a method of controlling a printing apparatus.

2. Related Art

In the past, there has been known a printing apparatus which displays a progress status of printing (see, e.g., JP-A-2008-129642 (Document 1)). The device in Document 1 transmits the same data as the image data to be transmitted to the printing apparatus to a memory for displaying, to thereby use the same image data as the image to be printed as data for displaying the print progress status.

The present disclosure displays an image currently printed and the progress status of the printing in a display area in an easy-to-understand manner when printing a plurality of images.

SUMMARY

An aspect of the present disclosure is directed to a printing apparatus including a printing mechanism configured to print images on a print medium, a print controller configured to make the printing mechanism perform a print job for printing the plurality of images with printing lengths designated, a display, and a display controller configured to make the display display a progress image representing an execution state of the print job, wherein the display controller makes the display display symbol images corresponding respectively to the images included in the print job with sizes corresponding to the printing lengths of the respective images as the progress image, and the display controller makes the display display an executed portion indication image representing a length of a portion already printed by the printing mechanism so as to be arranged at a position corresponding to the symbol image.

Another aspect of the present disclosure is directed to a print control device configured to control a printing mechanism configured to print images on a print medium, including a print controller configured to make the printing mechanism perform a print job for printing the plurality of images with printing lengths designated, and a display controller configured to make the display display a progress image representing an execution state of the print job, wherein the display controller makes the display display symbol images corresponding respectively to the images included in the print job with sizes corresponding to the printing lengths of the respective images as the progress image, and the display controller makes the display display an executed portion indication image representing a length of a portion already printed by the printing mechanism so as to be arranged at a position corresponding to the symbol image.

The print control device described above may be configured such that the display controller makes the display display the executed portion indication image constituted by an image obtained by changing some of display colors of the symbol image.

The print control device described above may be configured such that the display controller makes the display display the symbol images constituted by thumbnail images obtained by contracting the images to be printed by the printing mechanism.

The print control device described above may be configured such that the printing control device further includes an input device configured to receive an input, and the print controller changes a printing length in the print job in which printing by the printing mechanism is not currently started based on the input received by the input device.

The print control device described above may be configured such that the display controller changes a display condition of the symbol image corresponding to the print job in which a printing length cannot be changed when the input for changing the printing length in the print job was received by the input device.

The print control device described above may be configured such that the print controller changes a printing sequence in the print job in which printing by the printing mechanism is not currently started based on the input received by the input device.

The print control device described above may be configured such that the print controller makes the printing mechanism print the image defined in size to be printed on the print medium in accordance with the printing length designated with respect to the print job.

Another aspect of the present disclosure is directed to a method of controlling a printing apparatus having a printing mechanism configured to print images on a print medium, including the steps of performing a print job for printing the plurality of images with printing lengths designated, displaying, by a display, a progress image representing an execution state of the print job, displaying symbol images corresponding respectively to the images included in the print job with sizes corresponding to the printing lengths of the respective images as the progress image, and displaying an executed portion indication image representing a length of a portion already printed so as to be arranged at a position corresponding to the symbol image.

DESCRIPTION OF AN EXEMPLARY EMBODIMENT

An embodiment of the present disclosure will hereinafter be described with reference to the accompanying drawings. It should be noted that although in the embodiment described below, a variety of limitations are provided as preferred specific examples of the present disclosure, the scope of the present disclosure is not limited to the embodiment unless a description to limit the present disclosure thereto is particularly presented in the following explanations.

1. Configuration of Printer

Figure 1:
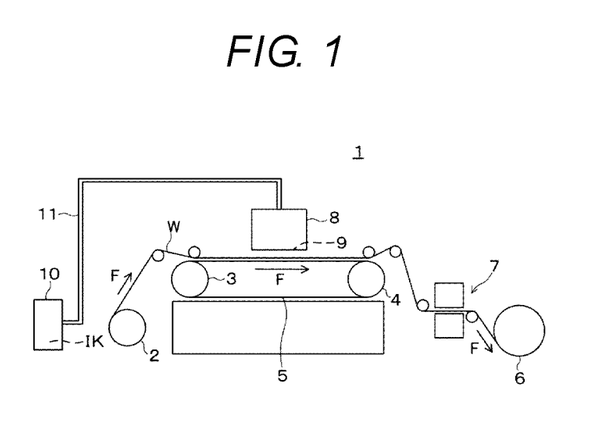
FIG. 1 is a schematic configuration diagram of a printer according to an embodiment.

FIG. 1 is a perspective view showing a configuration of a printer 1.

The printer 1 is an inkjet type printing apparatus which is provided with a print head 9 for discharging ink IK, and discharges the ink IK on a print medium W to form an image.

The print medium W is fabric formed of, for example, natural fibers or synthetic fibers. The printer 1 is a printing machine for making the ink IK adhere to the print medium W as the fabric to thereby perform printing of the print medium W, and the print medium W can be called a printing target material. Further, as the print medium W, it is also possible to use exclusive paper for inkjet recording such as plain paper, high-quality paper, and gloss paper, besides the printing target material described above.

The printer 1 is provided with an unreeling device 2 for conveying the print medium W, conveying rollers 3, 4, a conveying belt 5, and a winding device 6. These sections constitute a conveying mechanism 21 described later. The printer 1 is provided with the print head 9, and an ink cartridge 10 for retaining the ink IK to be used in the print head 9.

The unreeling device 2 is a device for unreeling the print medium W which is elongated, and is wound into a roll, and is located most upstream in the conveying path of the print medium W.

The conveying rollers 3, 4 are a pair of rollers for driving the conveying belt 5 having an endless shape, wherein the conveying roller 3 is a drive roller, and the conveying roller 4 is a driven roller, for example. The conveying belt 5 is a glue belt the surface of which is provided with an adhesive layer having an adhesive property. The print medium W fed from the unreeling device 2 is adhesively fixed to the adhesive layer of the conveying belt 5, and is conveyed in the conveying direction F together with the conveying belt 5.

The conveying belt 5 conveys the print medium W in the conveying direction F, and supports the print medium W at a position opposed to the print head 9.

The print head 9 is mounted on a carriage 8, and reciprocates in a main scanning direction SC described later above the print medium W together with the carriage 8.

The print head 9 is coupled to the ink cartridge 10 with an ink supply channel 11. The printer 1 is capable of performing color printing using the ink IK of a plurality of colors, and the ink IK of four colors of, for example, black (K), cyan (C), magenta (M), and yellow (Y) is used. Further, it is also possible for the printer 1 to have a configuration of using the ink IK of a custom color such as a metallic color. The printer 1 is equipped with the ink cartridge 10 for each color of the ink IK, and the print head 9 is provided with nozzles corresponding respectively to the colors of the ink IK, and jets the ink IK from each of the nozzles.

It is possible for the print head 9 to have a configuration of jetting a soakage to the print medium W besides the ink IK. The soakage is a liquid for facilitating penetration of the ink IK having adhered to the obverse surface of the print medium W to the reverse surface. For example, in the printer 1, it is possible to adopt a configuration in which a cartridge retaining the soakage is coupled to the print head 9 separately from the ink cartridge 10. In this case, the print head 9 discharges the soakage toward the print medium W at the same time as the jet of the ink IK, or at a different timing from the jet of the ink IK.

The winding device 6 is located downstream in the conveying path of the print medium W, and winds the print medium W printed by the print head 9 around a winding reel.

Upstream the winding device 6, there is disposed a drying section 7. The drying section 7 is located between the printing position by the print head 9 and the winding device 6, and dries the ink IK having adhered to the print medium W. The drying section 7 has, for example, a chamber for housing the print medium W and a heater disposed inside the chamber, and dries the ink IK which is located on the print medium W in an undried state with the heat of the heater.

In the configuration shown in FIG. 1, it is also possible to dispose a tensioner, an intermediate conveying roller, or both of the tensioner and the intermediate conveying roller between the unreeling device 2 and the conveying roller 3, and between the conveying roller 4 and the winding device 6. For example, the tensioner provides the tension to the print medium W conveyed by pressing the print medium W with a roller. The intermediate conveying roller conveys the print medium W with, for example, a pair of rollers pinching the print medium W.

Figure 2:
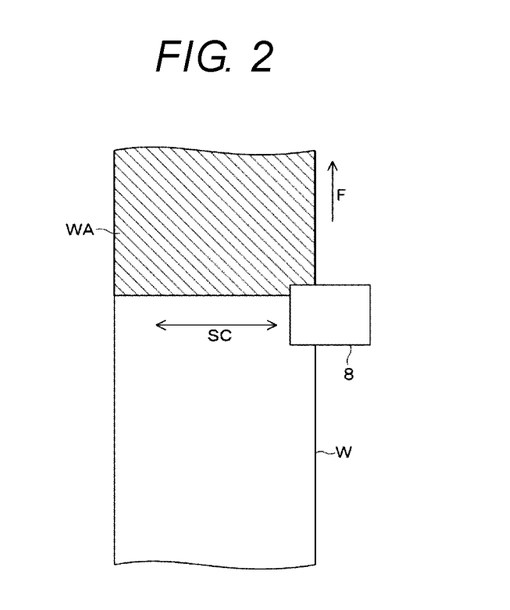
FIG. 2 is a schematic plan view showing a conveying direction of a print medium and a scanning direction of a carriage.

FIG. 2 is a schematic plan view showing the conveying direction of the print medium W and the scanning direction of the carriage 8. In FIG. 2, the area where the ink IK has adhered to the print medium W is represented by hatching as a printed area WA.

The carriage 8 is made to perform a reciprocating scan operation in a direction crossing the conveying direction F of the print medium W. In the present embodiment, the carriage 8 reciprocates in the main scanning direction SC crossing the conveying direction F. The length of the printed area WA in the conveying direction F is called a printing length.

2. Configuration of Control System of Printer

Figure 3:
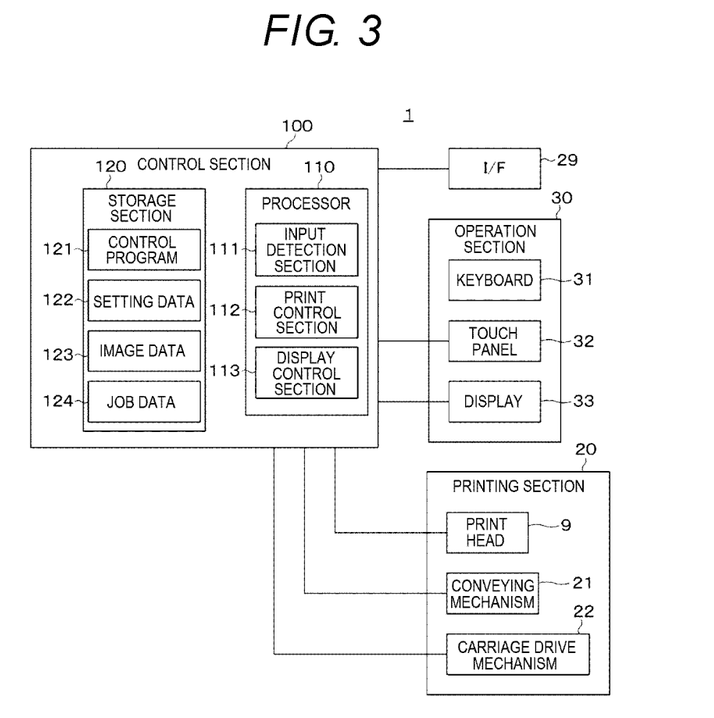
FIG. 3 is a block diagram of the printer.

FIG. 3 is a block diagram of the printer 1.

The printer 1 is provided with the control section 100 for controlling each section of the printer 1. The control section 100 is provided with a processor 110 for executing a program, and a storage section 120. The processor 110 is an arithmetic processing device formed of a CPU (central processing unit), a DSP (digital signal processor), a microcomputer, or the like. Further, the processor 110 can also be constituted by a plurality of pieces of hardware, or can also be formed of a single processor. Further, it is also possible for the processor 110 to be hardware programmed so as to realize the functions of the sections described later. In other words, it is possible for the processor 110 to have a configuration in which a control program 121 is implemented as a hardware circuit. In this case, for example, the processor 110 is formed of an ASIC (application specific integrated circuit) or an FPGA (field programmable gate array).

In the following description, there is described a configuration example for realizing the variety of functions of the control section 100 by the processor 110 executing the control program 121.

The control section 100 corresponds to a print control device.

The storage section 120 has a storage area for storing the program to be executed by the processor 110, and data to be processed by the processor 110. The storage section 120 stores the control program 121 to be executed by the processor 110, and setting data 122 including a variety of types of setting values related to the operation of the printer 1. The storage section 120 has a nonvolatile storage area for storing the program and the data in a nonvolatile manner. Further, it is also possible for the storage section 120 to be provided with a volatile storage area to forma print medium area for temporarily storing the program to be executed by the processor 110 and the data as the processing target.

To the control section 100, there is coupled a printing mechanism 20. The printing mechanism 20 includes the print head 9 and the conveying mechanism 21. The conveying mechanism 21 is a mechanism for conveying the print medium W, and includes the conveying rollers 3, 4 shown in FIG. 1, and a motor for driving these. Further, it is also possible for the conveying mechanism 21 to include the unreeling device 2 and the winding device 6. It is also possible for the conveying mechanism 21 to include the tensioner described above and the intermediate rollers described above.

Further, the printing mechanism 20 in the present embodiment includes a carriage drive mechanism 22. The carriage drive mechanism 22 is a mechanism for reciprocating the carriage 8 in the main scanning direction SC, and includes, for example, a motor as a drive source, a guide member for guiding the movement of the carriage 8, gears, links, and so on for transmitting the power of the motor to the carriage 8.

Further, it is also possible for a variety of sensors not shown to be coupled to the control section 100. For example, it is possible for a nozzle sensor for detecting a discharge failure of the nozzles provided to the print head 9, or a belt sensor for detecting a conveying failure in the conveying belt 5 to be coupled to the control section 100. It is also possible for the control section 100 to obtain and then determine detection values of the variety of sensors including these sensors, to thereby monitor the operation state of the printer 1.

To the control section 100, there is coupled an interface 29. The interface 29 is abbreviated as I/F in the drawing. The interface 29 is coupled to a device located outside the printer 1 with wire or wirelessly. The interface 29 is provided with, for example, a connector to which a cable is coupled, and an interface circuit for transmitting an electric signal via the cable. Further, it is also possible for the interface 29 to be a wireless communication module having an antenna and an RF circuit. The device located outside the printer 1 is, for example, a computer or a server device. When the control section 100 has received the image data from the external device by the interface 29, the control section 100 stores the image data thus received in the storage section 120. Further, when the control section 100 has received the job data for instructing printing from the external device by the interface 29, the control section 100 stores the job data thus received in the storage section 120.

The printer 1 is provided with an operation section 30. The operation section 30 is provided with a keyboard 31, a touch panel 32, and a display 33. It is also possible for the operation section 30 to have a configuration provided only with either one of the keyboard 31 and the touch panel 32. The display 33 corresponds to a display. Further, the operation section 30 is provided with the keyboard 31 and the touch panel 32 to thereby correspond to an input device.

The keyboard 31 has a plurality of keys to be operated by an operator, and outputs operation data representing the key having been operated to the control section 100. The display 33 has a display screen such as an LCD (liquid crystal display), and displays an image in accordance with the control by the control section 100. The touch panel 32 is disposed so as to be stacked on the display screen of the display 33, detects a contact operation to the display screen, and then outputs the operation data representing the contact position to the control section 100.

3. Configuration of Control Section

The control section 100 is provided with an input detection section 111, a print controller 112, and a display controller 113. As described above, by the processor 110 executing the control program 121, for example, these sections are realized due to the cooperation between software and hardware.

The storage section 120 stores the control program 121, the setting data 122, image data 123, and job data 124. The control program 121 is a program to be executed by the processor 110, and the setting data 122 includes a setting value related to the execution of the control program 121.

The input detection section 111 detects the input operation of the operator based on the operation data input from the keyboard 31 and the touch panel 32, and then obtains the content thus input. The input detection section 111 analyzes the data received via the interface 29, and when the image data has been received, the input detection section 111 stores the image data in the storage section 120 as the image data 123. Further, when the data related to the print job has been received, the input detection section 111 stores the data related to the print job as the job data 124.

The image data 123 is the data of an image to be printed on the print medium W by the print head 9, and it is possible for the storage section 120 to store a plurality of image data 123.

The print controller 112 controls the print head 9, the conveying mechanism 21, and the carriage drive mechanism 22 to perform printing on the print medium W in accordance with the job data 124.

The job data 124 is data for the print controller 112 to perform printing in terms of a single print job or a plurality of print jobs. Here, the print job will be described.

Figure 4:
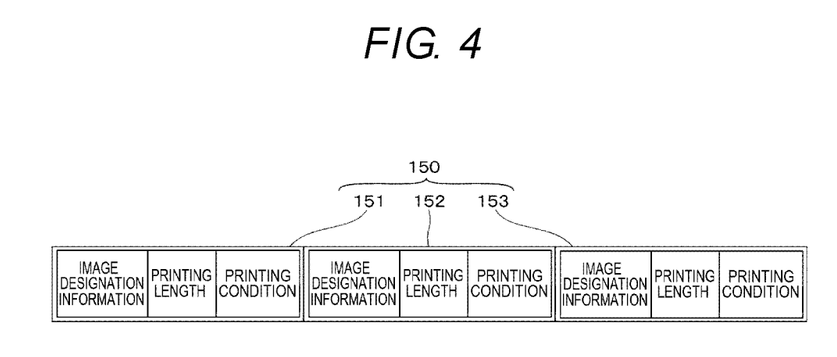
FIG. 4 is a schematic diagram showing a configuration of a print job.

FIG. 4 is a schematic diagram showing a configuration of the print job 150. The job data 124 is data including a single print job 150 or a plurality of print jobs 150.

The print job 150 includes information for printing the image with a designated printing length. The print job 150 can be information for printing a single image, or can also be provided with a configuration of including information related to a plurality of images. The print job 150 illustrated in FIG. 4 includes first information 151, second information 152, and third information 153 as information for printing three images with the designated printing lengths.

The print job 150 can also be data input to the printer 1 via the interface 29. Further, it is also possible for the control section 100 to generate the first information 151, the second information 152, and the third information 153 based on the information input by an operation of the keyboard 31, the touch panel 32, or keyboard 31 and the touch panel 32, and then store the first information 151, the second information 152, and the third information 153 in the storage section 120 as the job data 124.

The first information 151 includes image designation information, a printing length, and a printing condition. The image designation information is information for designating an image to be printed on the print medium W by the printing mechanism 20. The image designation information designates any of the image data 123 stored in the storage section 120. For example, when the storage section 120 stores each of the image data 123 as a single file, the image designation information includes a file name or a file path for designating any of the image data 123.

The printing length is information for designating the length of an area in which the image designated by the image designation information is printed. The size in the conveying direction F of the print medium W on which the image targeted by the first information 151 is printed is designated by the printing length by, for example, meters. When the printing length is longer than the image size of the image data 123, the print controller 112 repeatedly prints the image of the image data 123 on the print medium W. Therefore, the image data 123 can also be data of a smaller image compared to the printing length. Further, the image data 123 can also be data of an image smaller in size than the print medium W in the direction perpendicular to the conveying direction F, namely smaller in width than the print medium W. In this case, the print controller 112 repeatedly prints the image of the image data 123 also in the width direction of the print medium W.

The printing condition includes a condition when the print head 9 prints the image. For example, the printing condition includes a printing resolution of the image to be printed by the print head 9. Further, the printing condition can also include information for designating printing density or an amount of the ink per unit area.

When the print controller 112 performs the print job 150, the print controller 112 prints one image or a plurality of images designated by the information included in the print job 150 in a lump. As shown in FIG. 4, when the print job 150 includes the information related to the plurality of images, the print controller 112 continuously prints a plurality of images designated by the print job 150 in sequence.

The print job 150 shown in FIG. 4 is illustrative only, and it is also possible for the print job 150 to include one printing condition common to all of the images designated. In other words, the print job 150 is not limited to an example including the first information 151, the second information 152, and the third information 153 as information independent image by image. It is sufficient for the print job 150 to include information for designating a single image or a plurality of images to continuously be printed, and information for designating the printing lengths of the respective images.

The print controller 122 refers to the job data 124 to obtain the data of the print job 150 designated by an operation of the operation section 30. The print controller 112 prints the one image or the plurality of images with the printing mechanism 20 in accordance with the print job 150 thus designated.

The display controller 113 controls the display 33 to display a variety of images.

The display controller 113 displays symbol images representing the images to be printed with the sizes corresponding to the printing lengths of the images when the print controller 112 performs the print job 150. Further, the display controller 113 displays executed portion indication images together with the symbol images as images representing the progress status of printing by the printing mechanism 20.

Figure 5:
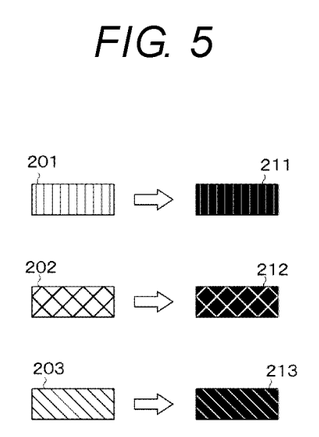
FIG. 5 is a diagram showing an example of symbol images and executed portion indication images.

FIG. 5 is a diagram showing an example of the symbol images and the executed portion indication images to be displayed on the display 33 by the display controller 113.

The symbol images 201, 202, and 203 are images to be displayed on the display 33, and each represent an image to be printed on the print medium W by the printing mechanism 20.

The symbol images 201, 202, and 203 are thumbnail images generated from the images for printing included in the image data 123, and are each an image with the compatible number of pixels with the display resolution of the display 33. It is possible for the symbol images 201, 202, and 203 to be generated in advance based on the image data 123, and then stored in the storage section 120, or to be generated by the print controller 112 when executing the print job 150.

As described later, the display controller 113 sets the display sizes of the symbol images 201, 202, and 203 in accordance with the printing lengths, and then changes the display sizes thereof. Therefore, the number of pixels of each of the symbol images 201, 202, and 203 can also be the number of pixels determined so as to be able to cope with a change in the display size. The number of pixels thus determined is called a unit size. In this case, it is possible for the display controller 113 to display a plurality of symbol images 201, 202, and 203 each having the unit size side by side in accordance with the display sizes of the symbol images 201, 202, and 203.

The display controller 113 displays the executed portion indication images 211, 212, and 213 together with the symbol images 201, 202, and 203, or instead of the symbol images 201, 202, and 203. The executed portion indication images 211, 212, and 213 are images generated based on the symbol images 201, 201, and 203.

The executed portion indication images 211, 212, and 213 are images obtained by changing the display conditions of the symbol images 201, 202, and 203. For example, as shown in FIG. 5, the executed portion indication image 211 is an image obtained by changing the display color of the symbol image 201. The executed portion indication image 211 is, for example, an image obtained by replacing anyone of the colors constituting the symbol image 201 with another color. Alternatively, the executed portion indication image 211 is an image obtained by coloring the whole of the symbol image 201 with a predetermined color, and image obtained by changing the luminance or the chroma of the symbol image 201 to a predetermined value, an image obtained by reversing the color of the symbol image 201, and so on. The executed portion indication images 212, 213 are similarly images obtained by changing the display colors of the symbol images 202, 203.

In the following description, the symbol image 201 is a thumbnail image of the image designated by the image designation information of the first information 151 shown in FIG. 4, and the symbol image 202 is a thumbnail image of the image designated by the image designation information of the second information 152. The symbol image 203 is a thumbnail image of the image designated by the image designation information of the third information 153.

4. Operation of Printer

Then, an operation of the printer 1 will be described. The operation described hereinafter is an operation example when the printer 1 prints the images on the print medium W based on the print job 150.

Figure 6:
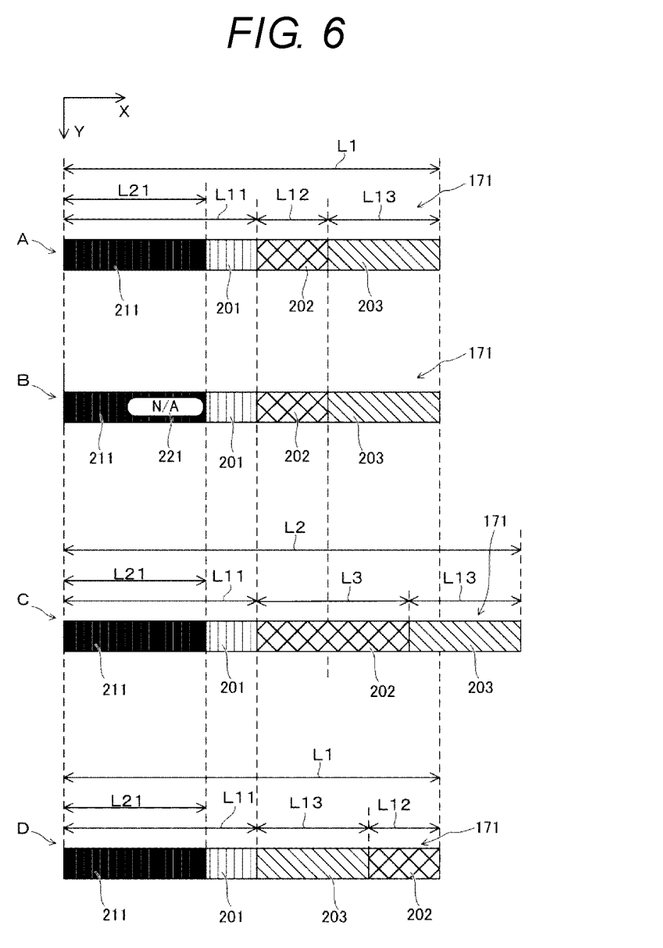
FIG. 6 is a diagram showing some examples of a progress image.

FIG. 6 is a diagram showing some examples of a progress image 171 to be displayed on the display 33 by the display controller 113. In FIG. 6, the display conditions of the progress image 171 corresponding to the operation state of the printer 1 are denoted by symbols A, B, C, and D.

Figure 7:
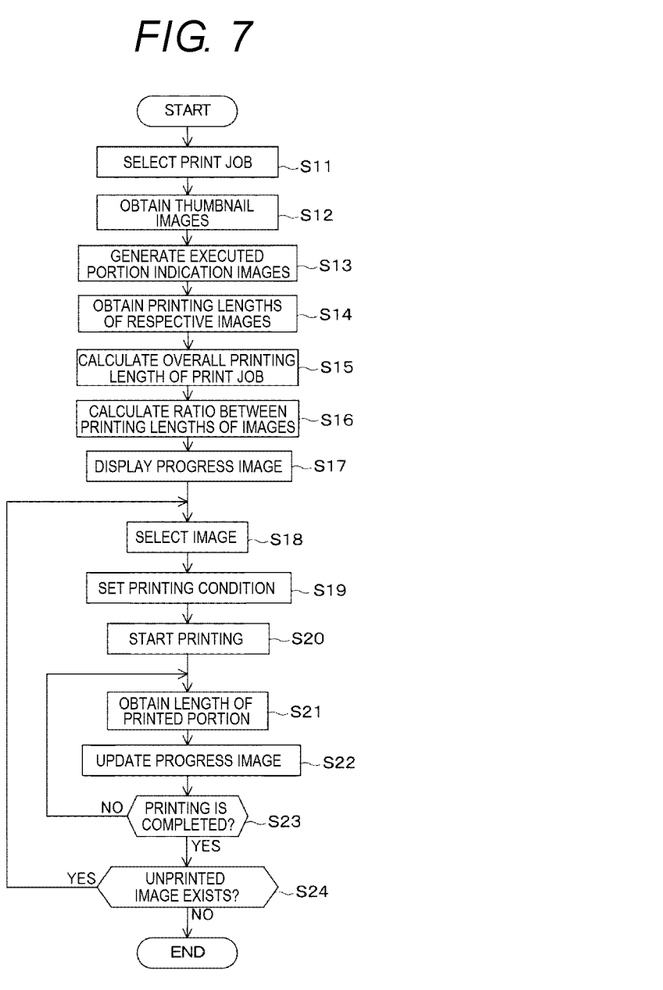
FIG. 7 is a flowchart showing an operation of the printer.
Figure 8:
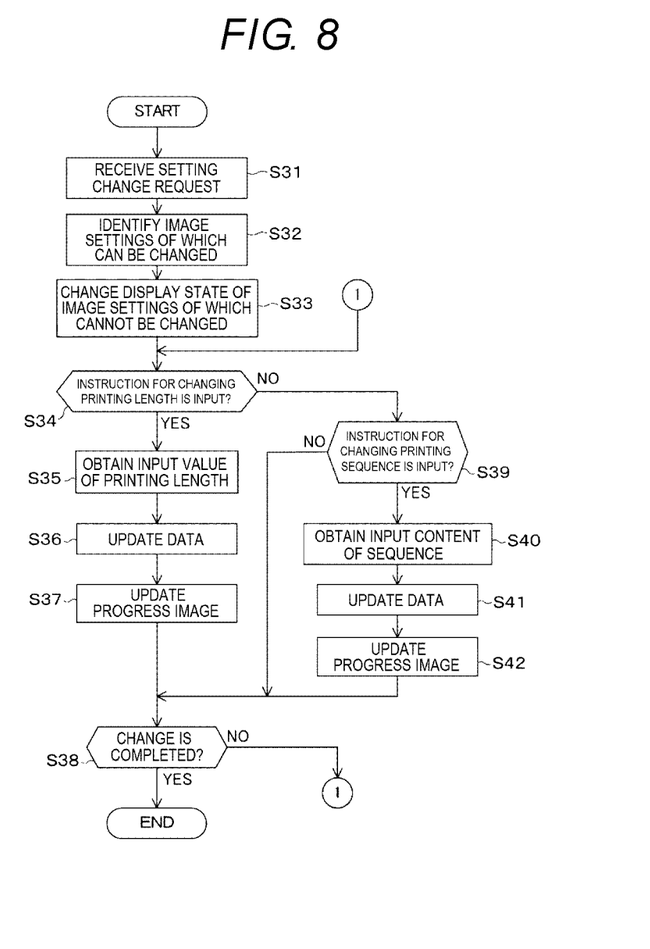
FIG. 8 is a flowchart showing an operation of the printer.

FIG. 7 and FIG. 8 are each a flowchart representing an operation of the printer 1.

The progress image 171 is an image to be displayed on the display 33 by the display controller 113 when the image control section 112 performs the print job 150. In the drawings, a horizontal direction in the display area of the display 33 is denoted by a symbol X, and a vertical direction is denoted by a symbol Y.

The display sizes of the symbol images 201, 202, and 203 are fixed sizes in the Y direction, and are variable in the X direction. The display sizes L1, L2, L3, L11, L12, L13, and L21 are display sizes in the X direction, and each can also be said as a display length.

The progress image 171 includes the symbol images 201, 202, and 203. The symbol images 201, 202, and 203 are the thumbnail images of the images to be printed in the print job 150 as described above. The progress image 171 is configured by arranging the symbol images 201, 202, and 203 in accordance with the printing sequence in the print job 150 starting from the left.

The display size L11 of the symbol image 201, the display size L12 of the symbol image 202, and the display size L13 of the symbol image 203 are respectively proportional to the printing lengths of the first information 151, the second information 152, and the third information 153. In other words, the ratio of (the display size L11):(the display size L12):(the display size L13) is equal to the ratio of (the printing length of the first information 151):(the printing length of the second information 152):(the printing length of the third information 153).

In the present embodiment, the display size L1 of the whole of the progress image 171 is variable. In this case, the display size L1 has a length obtained by summing the display sizes L11, L12, and L13.

In this case, the display controller 113 can also display the progress image 171 with the display size L1 fixed. In this case, the display sizes L11, L12, and L13 become the display sizes obtained by prorating the display size L1 based on the printing lengths.

After the print controller 112 starts printing, the display controller 113 displays the executed portion indication images 211, 212, and 213 corresponding to the lengths of the portions which have already been printed at positions corresponding to the symbol images 201, 202, and 203. The executed portion indication image 211 represents the fact that at least a part of the image corresponding to the symbol image 201 has already been printed, and the display size L21 represents the length of the printed area WA in the conveying direction F. In other words, the ratio of (the display size L11):(the display size L21) is equal to the ratio of (the printing length of the first information 151):(the length of the portion having already been printed).

As described above, by the executed portion indication image 211 being visually recognized so as to be overlapped with the symbol image 201, the length of the portion having already been printed by the printing mechanism 20 can clearly be displayed out of the printing length of the symbol image 201. The display position of the executed portion indication image 211 is only required to be a position corresponding to the symbol image 201, and is not limited to the position overlapping the symbol image 201. For example, it is also possible for the executed portion indication image 211 to be displayed so as to be arranged below or above the symbol image 201.

Further, after the printing of the images corresponding to the symbol images 202, 203 has started, the executed portion indication images 212, 213 corresponding to the symbol images 202, 203 are displayed at the positions corresponding respectively to the symbol images 202, 203.

The operation of the printer 1 including the progress image 171 will be described along the flowchart shown in FIG. 7.

The process shown in FIG. 7 is started by the input detection section 111 receiving the input for selecting the print job to be executed, and the input for instructing the execution of the print job. The print controller 112 selects (step S11) the print job 150 designated by the input to the input detection section 111. Here, the display controller 113 obtains (step S12) the thumbnail images of the images to be printed in the print job 150 selected in the step S11. In the step S12, the display controller 113 performs a process of obtaining the thumbnail images stored in the storage section 120, or a process of generating the thumbnail images based on the image data 123. The thumbnail mages obtained in the step S12 are used as the symbol images 201, 202, and 203.

The display controller 113 generates (step S13) the executed portion indication images 211, 212, and 213 based on the thumbnail images obtained in the step S12. Further, the display controller 113 obtains (step S14) the printing lengths of the images from the print job 150. The display controller 113 calculates (step S15) the total printing length of the print job 150, and then calculates (step S16) of the ratio between the printing lengths of the images in the print job 150.

The display controller 113 makes the display 33 display (step S17) the progress image 171 in accordance with the printing lengths obtained or calculated in the steps S14, S15 and the ratio calculated in the step S16.

The print controller 112 selects (step S18) the image to be printed in accordance with the print job 150 selected in the step S11, then sets (step S19) the printing condition of the image thus selected, and then starts (step S20) printing the image.

The display controller 113 obtains (step S21) the length of the portion having been printed due to the control by the print controller 112 to update (step S22) display of the progress image 171 based on the length thus obtained. In the step S21, it is possible for the display controller 113 to, for example, obtain the conveying amount of the print medium W by the conveying mechanism 21 from the beginning of the printing, or it is possible for the display controller 113 to calculate the conveying amount of the print medium W.

In the step S22, the print controller 112 performs a process of displaying the executed portion indication images 211, 212, and 213 in the progress image 171, or a process of changing the display sizes of the executed portion indication images 211, 212, and 213.

The display controller 113 determines (step S23) whether or not the printing of the image started in the step S20 is completed, and when the printing is not completed (NO in the step S23), the process returns to the step S21. The display controller 113 repeatedly performs the process in the steps S21 through S22 with a period set in advance.

When the printing of the image is completed (YES in the step S23), the print controller 112 determines (step S24) whether or not the image having not been printed exists in the print job selected in the step S11. When the image having not been printed exists (YES in the step S24), the print controller 112 returns the process to the step S18 to select the next image. Further, when the image having not been printed does not exist, namely the printing of all of the images in the print job 150 (NO in the step S24), the control section 100 terminates the present process.

The printer 1 executes printing on the print medium W in accordance with the print job 150, and displays the symbol images 201, 202, and 203 representing the images to be printed on the display 33 in the display sizes corresponding to the printing lengths of the respective images during printing. Therefore, it is possible for the operator who operates the printer 1 to visually figure out with ease the images of the actual printed material to be printed in the print job 150.

For example, when the print medium W is a cloth product used for manufacturing a clothing ornament or an interior product, the length of the print medium W, and the printing length thereof printed by the printer 1 are made long. Therefore, it is not easy to figure out the printing length of the image in the print medium W. In particular, when continuously printing a plurality of images, it is more difficult to figure out the printing lengths of the respective images, and therefore, the operator performs work heavy in labor in some cases for setting or confirming the printing lengths. According to the printer 1, it is possible to easily figure out the printing lengths of the respective images based on the ratio between the display sizes L11, L12, and L13 of the symbol images 201, 202, and 203 representing the images to be printed. In other words, since the symbol images 201, 202, and 203 representing the respective images to be printed are arranged on the display 33 in accordance with the printing sequence, it is possible to visually figure out the printing sequence and the printing lengths, and it is possible to easily determine whether or not the setting of the print job 150 is correct, for example. Further, the printer 1 displays the length of the print medium W having already been printed by the printing mechanism 20 with the executed portion indication images 211, 212, and 213. The display sizes of the executed portion indication images 211, 212, and 213 correspond to the length of the print medium W having already been printed, and the display controller 113 updates the progress image 171 during printing in accordance with the progress of the printing. Therefore, it is possible to easily know the progress status of the printing together in addition to the images to be printed using the progress image 171.

The printer 1 is capable of changing the setting of the image to be printed in the print job 150 in execution in the state in which the progress image 171 is displayed by the display 33. Specifically, it is possible for the print controller 112 to change the setting of the printing lengths and the printing sequence of the images included in the print job 150 in accordance with the input detected by the input detection section 111. This change in the setting can also be executed even after starting printing by the printing mechanism 20. However, the print controller 112 does not change the setting regarding the image having already been printed and the image printing of which has already been started.

In the state A shown in FIG. 6, when a change in setting has been requested, the display controller 113 gives notice of the fact that the setting cannot be changed with respect to the image the setting of which cannot be changed using display. The state B shown in FIG. 6 represents the state in which a notification image 221 is displayed at a position corresponding to the symbol image 201. The notification image 221 is an image for giving a notice of the fact that the setting cannot be changed with respect to the image corresponding to the symbol image 210. The notification image 221 can also be an image not including a character. Further, the display position of the notification image 221 is not limited to the position overlapping the symbol image 201 or the executed portion indication image 211, but can also be a position arranged above or below the symbol image 201.

In the state B, when a change in setting of the images corresponding respectively to the symbol images 202, 203, the print controller 112 changes the setting values of the printing lengths in the print job 150 or the printing sequence in the print job 150 in accordance with the input detected by the input detection section 111.

When the printing length or the printing sequence has been changed by the print controller 112 during the period in which the progress image 171 is displayed, the display controller 113 updates the progress image 171 in accordance with the printing lengths and the printing sequence having been changed.

The state C is a display example when the printing length has been changed, and represents the example in which the printing length of the image corresponding to the symbol image 202 has been changed to longer one. In the state C, the display size of the symbol image 202 is changed to the display size L3 longer than the display size L12 in the states A, B. Accordingly, the display size of the whole of the progress image 171 is changed to the display size L2 longer than the display size L1. The symbol image 203 is displayed with the display size L13 which is the same as before updating the progress image 171.

The state D is a display example when the printing sequence has been changed, and represents the example in which the image corresponding to the symbol image 202 and the image corresponding to the symbol image 203 are exchanged in order. In the state D, the symbol image 203 is displayed adjacently to the symbol image 201, and the symbol image 202 is displayed on the right of the symbol image 203. The display sizes of the symbol images 201, 202, and 203 are not changed.

The operation related to the change in setting of the printing and the update of the progress image 171 is shown in the flowchart of FIG. 8.

The operation in FIG. 8 is started as interrupt processing when the change in setting has been requested by an operation of the keyboard 31, the touch panel 32, or the keyboard 31 and the touch panel 32.

The control section 100 receives (step S31) the request of the change in setting with the input detection section 111. The print controller 112 identifies (step S32) an image the setting of which can be changed out of the images included in the print job 150 selected in the step S11. The display controller 113 changes (step S33) the display state of the progress image 171 with respect to the image setting of which cannot be changed based on the result of the processing in the step S32. In the step S33, the display controller 113 changes the display conditions of the symbol images 201, 202, and 203 corresponding respectively to the images setting of which cannot be changed. For example, the display controller 113 changes the display colors of the symbol images 201, 202, and 203, or displays the notification image 221 at positions corresponding to the symbol images 201, 202, and 203.

The display controller 112 determines (step S34) whether or not the instruction of changing the printing length has been input using the input detection section 111. When the instruction of changing the printing length has been input (YES in the step S34), the print controller 112 obtains (step S35) the input value of the printing length to be changed. The print controller 112 changes (step S35) the printing length in the print job 150 as the target of the change in the job data 124 based on the input value. The display controller 113 updates (step S37) the display of the progress image 171 in accordance with the printing length changed in the step S36.

The control section 100 determines (step S38) whether or not the change in setting is completed. In the step S38, the control section 100 makes an affirmative determination when the input of instructing the termination of the change in setting has been performed by the operation of, for example, the keyboard 31 or the touch panel 32 (YES in the step S38). When the change in setting is completed (YES in the step S38), the control section 100 terminates the present process. Further, when the change in setting is not completed (NO in the step S38), the control section 100 returns the process to the step S34.

When the instruction of changing the printing length has not been input (NO in the step S34), the print controller 112 determines (step S39) whether or not the instruction of changing the printing sequence has been input using the input detection section 111. When the instruction of changing the printing sequence has not been input (NO in the step S39), the print controller 112 makes the transition of the process to the step S38.

When the instruction of changing the printing sequence has been input (YES in the step S39), the print controller 112 obtains (step S40) the input content of the sequence to be changed. The print controller 112 changes (step S41) the order of the images in the print job 150 as the target of the change in the job data 124 based on the input content. The display controller 113 updates (step S42) the display of the progress image 171 in accordance with the printing sequence changed in the step S41, and then makes the transition of the process to the step S38.

As described above, in the printer 1, it is possible to change the printing length of the image to be printed and the printing sequence in the state in which the progress image 171 is displayed. Therefore, it is possible for the operator of the printer 1 to visually confirm the printing lengths and the printing sequence of the images using the progress image 171 to easily correct them as needed when performing the printing in accordance with the print job 150. Further, since the progress image 171 is updated in accordance with the change in printing length and the change in printing sequence, it is possible to visually confirm the printing length and the printing sequence in real time.

As described hereinabove, the printer 1 according to the present embodiment is provided with the printing mechanism 20 for printing images on the print medium W, and the print controller 112 for making the printing mechanism 20 perform the print job 150 for printing a plurality of images with the printing lengths designated. The printer 1 is provided with the display 33, and the display controller 113 for making the display 33 display the progress image 171 representing the execution state of the print job 150. The display controller 113 makes the display 33 display the symbol images 201, 202, and 203 corresponding respectively to the images included in the print job 150 with the sizes corresponding to the printing lengths of the respective images as the progress image 171. The display controller 113 makes the display 33 display the executed portion indication images 211, 212, and 213 each showing the length of the portion having already been printed by the printing mechanism 20 so as to be arranged at the positions corresponding respectively to the symbol images 201, 202, and 203.

According to the printing apparatus, the print control device, and the printer 1 to which the method of controlling the printing apparatus is applied related to the present disclosure, when printing the image on the print medium W in accordance with the print job 150, the symbol images 201, 202, and 203 representing the respective images to be printed are displayed. The display sizes of the symbol images 201, 202, and 203 in the display 33 correspond to the printing lengths of the images to be printed in the print job 150. Therefore, it is possible to display the images to be printed and the printing lengths on the display 33 in an easy-to-understand manner. The symbol images 201, 202, and 203 are the symbols representing the images to actually be printed by the printing mechanism 20, and can therefore be displayed even when the display area of the display 33 is small. Therefore, it is possible to display the images to be printed and the printing lengths in the limited display area in an easy-to-understand manner. Further, since the executed portion indication images 211, 212, and 213 are displayed at the positions corresponding respectively to the symbol images 201, 202, and 203 in accordance with the progress of the printing, it is possible to display the progress status of the printing in an easy-to-understand manner.

The display controller 113 makes the display 33 display the executed portion indication images 211, 212, and 213 constituted by the images obtained by changing some of the display colors of the symbol images 201, 202, and 203, respectively. Therefore, it is possible to make the display 33 display the progress status of the printing of the images corresponding to the symbol images 201, 202, and 203 in an easy-to-understand manner with the images which can easily and simply be generated.

The display controller 113 makes the display 33 display the symbol images 201, 202, and 203 constituted by the thumbnail images obtained by contracting the images to be printed by the printing mechanism 20. Therefore, it is possible to display the images to be printed in the limited display area in an easy-to-understand manner using the symbol images 201, 202, and 203 clearly representing the content of the images to be printed.

The printer 1 is provided with the input detection section 111 for receiving the input by the keyboard 31 and the touch panel 32. The print controller 112 changes the printing lengths in the print job 150 in which the printing by the printing mechanism 20 has not been started based on the input received by the input detection section 111. Therefore, the setting of the printing lengths notified of by the display using the symbol images 201, 202, and 203 can easily be changed as needed.

When the input for changing the printing lengths in the print job 150 has been received by the input detection section 111, the display controller 113 changes the display conditions of the symbol images 201, 202, and 203 corresponding to the print job 150 the printing length in which cannot be changed. Therefore, it is possible to inform the operator who performs the operation of changing the printing length of the image the printing length of which cannot be changed in an easy-to-understand manner.

The print controller 112 changes the printing sequence in the print job 150 in which the printing by the printing mechanism 20 has not been started based on the input received by the input detection section 111. Therefore, the setting of the printing sequence of the images to be displayed using the symbol images 201, 202, and 203 can easily be changed as needed.

The print controller 112 makes the printing mechanism 20 print the image defined in size to be printed on the print medium W in accordance with the printing length designated with respect to the print job 150. Therefore, in the printer 1 for printing the images on the print medium W with the printing lengths designated, it is possible to display the printing lengths in an easy-to-understand manner by expressing the printing lengths by the display sizes of the symbol images 201, 202, and 203.

It should be noted that the embodiment described above shows a specific example to which the present disclosure is applied, and the present disclosure is not limited to the embodiment.

For example, although in the embodiment described above, the description is presented citing the printer 1 for conveying the print medium W wound to form a rolled shape to print an image thereon as an example, the present disclosure is not limited to this example. For example, it is possible to apply the present disclosure to a printer for fixedly holding the print medium such as the fabric as a print target, and relatively moving the print head 9 with respect to the print medium to thereby perform printing. For example, it is also possible to apply the present disclosure to a so-called garment printer for fixing clothing or sewing cloth as the print medium, and discharging ink to the print medium to thereby perform printing. Further, it is also possible to apply the present disclosure to a printing apparatus for performing printing not only on the fabric, but also on a knitted material, paper, a sheet made of synthetic resin, and so on.

Further, the application target of the present disclosure is not limited to a device used alone as the printing apparatus, but it is also possible to apply the present disclosure to a device having a function other than the printing function such as a multifunctional machine having a copying function or a scanning function, or a POS terminal device.

Further, the printer 1 can also be a device using the ink IK curing by ultraviolet irradiation, and in this case, it is also possible to provide the printer 1 with an ultraviolet irradiation device instead of the drying section 7. Further, it is also possible for the printer 1 to have a configuration provided with a washing device for washing the print medium W having been dried by the drying section 7, and other detailed configurations of the printer 1 can arbitrarily be changed.

Further, the functional sections of the control section 100 can be constituted as a program to be executed by the processor 110 as described above, and in addition, it is also possible to realize the functional sections of the control section 100 by a hardware circuit incorporating the program. Further, it is also possible to adopt a configuration in which the printer 1 receives the program described above from a server device or the like via a transmission medium.

What is claimed is:

1. A printing apparatus comprising:
a printing mechanism configured to print images on a print medium;
a print controller configured to make the printing mechanism perform a print job for printing a plurality of images with printing lengths designated;
a display; and
a display controller configured to make the display display a progress image representing an execution state of the print job, wherein
the display controller makes the display display symbol images corresponding respectively to the images included in the print job with sizes corresponding to the printing lengths of the respective images as the progress image,
the display controller makes the display display an executed portion indication image representing a length of a portion already printed by the printing mechanism so as to be arranged at a position corresponding to the symbol image, and
the display controller makes the display display the executed portion indication image constituted by an image obtained by changing some of display colors of the symbol image.

2. A print control device configured to control a printing mechanism configured to print images on a print medium, comprising:

a print controller configured to make the printing mechanism perform a print job for printing a plurality of images with printing lengths designated; and
a display controller configured to make the display display a progress image representing an execution state of the print job, wherein
the display controller makes the display display symbol images corresponding respectively to the images included in the print job with sizes corresponding to the printing lengths of the respective images as the progress image,
the display controller makes the display display an executed portion indication image representing a length of a portion already printed by the printing mechanism so as to be arranged at a position corresponding to the symbol image, and
the display controller makes the display display the executed portion indication image constituted by an image obtained by changing some of display colors of the symbol image.

3. The print control device according to claim 2, wherein the display controller makes the display display the symbol images constituted by thumbnail images obtained by contracting the images to be printed by the printing mechanism.

4. The print control device according to claim 2, further comprising:
an input device configured to receive an input, wherein
the print controller changes a printing length in the print job in which printing by the printing mechanism is not currently started based on the input received by the input device.

5. The print control device according to claim 4, wherein the display controller changes a display condition of the symbol image corresponding to the print job in which a printing length cannot be changed when the input for changing the printing length in the print job was received by the input device.

6. The print control device according to claim 4, wherein the print controller changes a printing sequence in the print job in which printing by the printing mechanism is not currently started based on the input received by the input device.

7. The print control device according to claim 2, wherein the print controller makes the printing mechanism print the image defined in size to be printed on the print medium in accordance with the printing length designated with respect to the print job.

8. A method of controlling a printing apparatus having a printing mechanism configured to print images on a print medium, the method comprising:
performing a print job for printing a plurality of images with printing lengths designated;
displaying, by a display, a progress image representing an execution state of the print job;
displaying symbol images corresponding respectively to the images included in the print job with sizes corresponding to the printing lengths of the respective images as the progress image;
displaying an executed portion indication image representing a length of a portion already printed so as to be arranged at a position corresponding to the symbol image, wherein the executed portion indication image is constituted by an image obtained by changing some of display colors of the symbol image.

* * * * *